July 5, 1927.

J. E. CARROLL 1,634,453

MECHANICAL MOVEMENT

Filed July 3, 1924

INVENTOR
John E. Carroll
By W. W. Williamson, Atty.

July 5, 1927.

J. E. CARROLL

MECHANICAL MOVEMENT

Filed July 3, 1924

INVENTOR
John E. Carroll
By W. W. Williamson Atty.

Patented July 5, 1927.

1,634,453

UNITED STATES PATENT OFFICE.

JOHN E. CARROLL, OF SAGINAW, MICHIGAN.

MECHANICAL MOVEMENT.

Application filed July 3, 1924. Serial No. 724,158.

My invention relates to new and useful improvements in a mechanical movement, and more particularly to a change speed mechanism having for its primary object the transmission of motion from a driving element to a driven element at a different speed.

Another object of the invention is to provide a gear operable within and meshing with spindles of a lantern wheel, said gear being anchored to prevent revolving thereof while permitting a limited oscillatory movement produced by an eccentric on the operating shaft.

A further object of this invention is to provide, in combination, two lantern wheels having a shell or casing connected therewith to act as the rim of a pulley, an internally cut gear wheel meshing with one of the lantern wheels, an externally cut gear wheel meshing with the other lantern wheel, and means to operate either of the gear wheels whereby the shell or casing may be revolved in either direction.

A still further object of the invention is to provide a lantern wheel and coacting gear the latter having a less number of teeth than the former whereby only a portion of the motion of the gear wheel is transmitted to the lantern wheel thereby changing the speed of motion transmitted from the gear wheel to the lantern wheel.

With these ends in view, this invention consists in the details of construction and combination of elements hereinafter set forth and then specifically designated by the claim.

In order that those skilled in the art to which this invention appertains, may understand how to make and use the same, I will describe its construction in detail, referring by numerals to the accompanying drawings forming a part of this application, in which:—

Figures 1, 2:
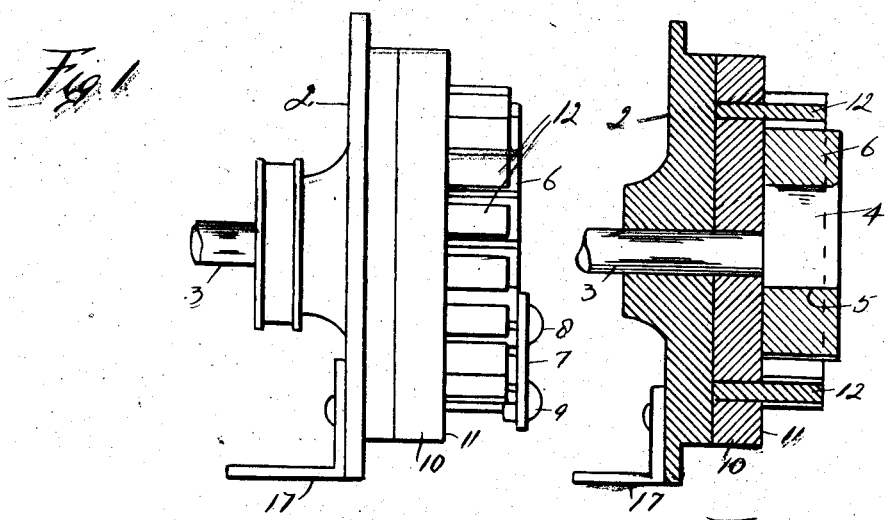
Fig. 1 is a side elevation of a structure embodying the invention.
Fig. 2 is a sectional view thereof.
Figure 3:
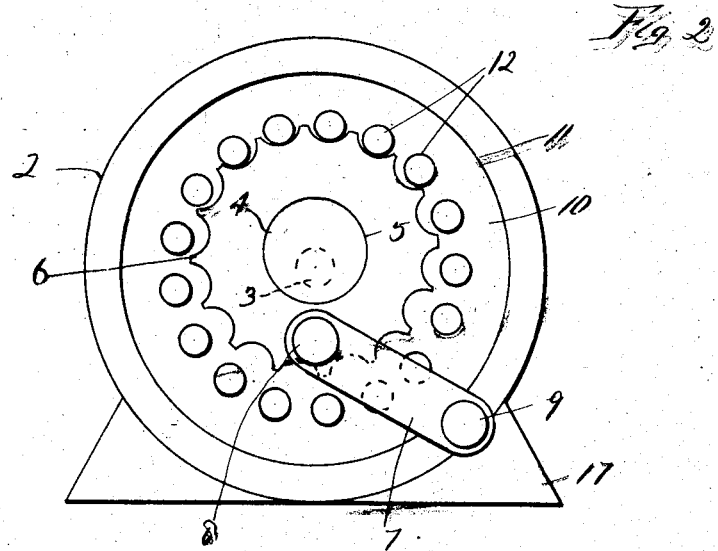
Fig. 3 is a face view of the same.

In carrying out the invention as herein embodied, 2 represents an end plate which acts as a bearing for a shaft 3 having an eccentric 4 fixed thereon and operating within the concentric hole 5 of the external gear 6. The part 6 has been herein set forth as a gear for want of a better term as it will be understood from the further description that this element does not have the action of an ordinary gear wheel since it does not revolve. This gear 6 is anchored to prevent revolution thereof while permitting a limited oscillatory movement produced by the eccentric 4 and in order to do this I pivot one end of a link 7 to the gear 6 as at 8 while the other end is pivoted at 9 to the end plate 2.

Between the end plate 2 and the external gear 6 is mounted the disc 10 of the lantern wheel 11 said lantern wheel including spindles 12 to be engaged by the teeth of the gear 6, said spindles being outside of said gear.

There is one more spindle in the lantern wheel than there are teeth in the gear, for instance, where seventeen spindles are used on the lantern wheel there are but sixteen teeth on the gear so that as the shaft 3 is revolved the eccentric 4 will oscillate the gear 6 and cause the lantern wheel to be rotated.

Figure 4:
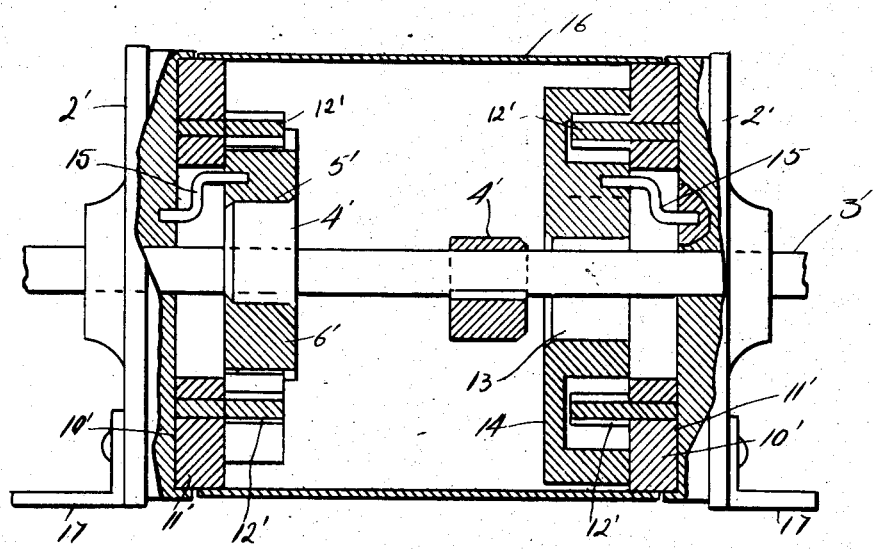
Fig. 4 is a sectional view of a complete element with portions being left in elevation.
Figure 5:
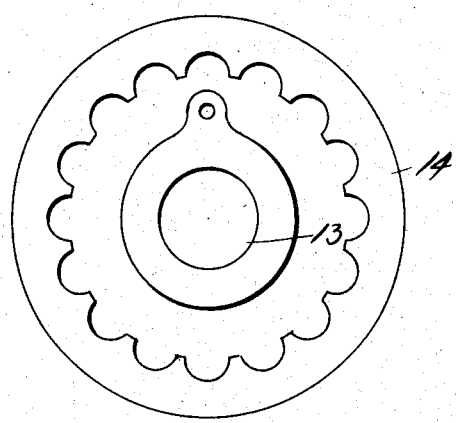
Fig. 5 is a face view of the internally cut gear.

In Fig. 4, I have shown a utilization of the structure set forth above wherein 2' represents the end plates in which a shaft 3' is revolubly mounted. On this shaft are fixed a pair of eccentrics 4' one of which is adapted to be inserted in the hole 5' of the external gear 6' while the other one of said eccentrics is adapted to be inserted in the hole 13 of the external gear 14. Each of these gears is anchored so as to prevent revolution thereof while permitting a restricted oscillatory movement by means of cranks 15 which are the equivalent of the link 7 and the means for pivoting the ends of said link to the gear and end plate. The cranks 15 are pivotally connected with the gears 6' and 14 and to their respective end plates 2'.

Between each gear and its respective end plate is located a disc 10' of a lantern wheel 11', each of which also includes spindles 12'. The discs of said lantern wheels have central openings for the accommodation of the cranks 15.

The inner faces of the lantern wheel discs are set in the end plates and on their exposed peripheries are fixed the ends of a shell, casing or drum 16 which acts as the rim of a pulley for transmitting motion from the device above described to any mechanism through a belt or its equivalent.

When the shaft is actuating the gear 6' through its respective eccentric the drum 16 will be driven in one direction but when the shaft is moved longitudinally to engage the other eccentric with the gear 14 and disengage the first mentioned one from the gear 6' then the action will be reversed.

In practice suitable supporting means 17 is connected with one or both end plates.

Of course I do not wish to be limited to the exact details of construction as herein shown as these may be varied within the limits of the appended claim without departing from the spirit of my invention.

Having thus fully described my invention, what I claim as new and useful is:—

A mechanical movement for use as a change speed mechanism comprising, in combination, a pair of end plates, a shaft rotatably and slidably mounted in said end plates, eccentrics fixed on said shaft, an internal gear for cooperation with one of said eccentrics, an external gear for cooperation with the other of said eccentrics, means to hold the gears against rotation while permitting an oscillatory movement thereof due to the revolving of the eccentrics, lantern wheels each having one more spindle than teeth in the gears and coacting with said gears, and a drum fixed to the periphery of said lantern wheels.

In testimony whereof, I have hereunto affixed my signature.

JOHN E. CARROLL.